United States Patent
Wilytsch et al.

(10) Patent No.: US 11,054,896 B1
(45) Date of Patent: Jul. 6, 2021

(54) DISPLAYING VIRTUAL INTERACTION OBJECTS TO A USER ON A REFERENCE PLANE

(71) Applicant: Facebook, Inc., Menlo Park, CA (US)

(72) Inventors: Bojan Wilytsch, London (GB); Etienne Pinchon, London (GB)

(73) Assignee: Facebook, Inc., Menlo Park, CA (US)

( * ) Notice: Subject to any disclaimer, the term of this patent is extended or adjusted under 35 U.S.C. 154(b) by 98 days.

(21) Appl. No.: 16/270,084

(22) Filed: Feb. 7, 2019

(51) Int. Cl.
*G06F 3/0487* (2013.01)
*G06F 3/01* (2006.01)
*G06T 19/00* (2011.01)
*G02B 27/01* (2006.01)

(52) U.S. Cl.
CPC ............ *G06F 3/011* (2013.01); *G02B 27/017* (2013.01); *G06F 3/017* (2013.01); *G06F 3/0487* (2013.01); *G06T 19/006* (2013.01)

(58) Field of Classification Search
CPC ........ G06F 3/011; G06F 3/017; G06F 3/0487; G06T 19/006; G02B 27/017
See application file for complete search history.

(56) References Cited

U.S. PATENT DOCUMENTS

| | | | | |
|---|---|---|---|---|
| 9,767,613 B1* | 9/2017 | Bedikian | ............. | G06F 3/04845 |
| 2009/0066690 A1* | 3/2009 | Harrison | ............... | G06T 19/006 |
| | | | | 345/419 |
| 2012/0113223 A1* | 5/2012 | Hilliges | .................. | G06F 3/011 |
| | | | | 348/46 |
| 2013/0285904 A1* | 10/2013 | Kaplan | .................... | G06F 3/017 |
| | | | | 345/157 |
| 2015/0040040 A1* | 2/2015 | Balan | .................... | G06F 3/0482 |
| | | | | 715/762 |
| 2015/0106767 A1* | 4/2015 | Abercrombie | ...... | G06F 3/04815 |
| | | | | 715/848 |
| 2015/0242101 A1* | 8/2015 | Ishino | ...................... | G06T 7/75 |
| | | | | 715/776 |
| 2016/0018985 A1* | 1/2016 | Bennet | .................... | G06F 3/011 |
| | | | | 345/175 |
| 2016/0239080 A1* | 8/2016 | Margolina | ............. | G06T 19/20 |
| 2017/0068416 A1* | 3/2017 | Li | ........................ | G06F 3/04812 |
| 2017/0336941 A1* | 11/2017 | Gribetz | ................. | G06T 19/006 |
| 2018/0077409 A1* | 3/2018 | Heo | ...................... | H04N 13/122 |
| 2018/0322701 A1* | 11/2018 | Pahud | ..................... | G06F 3/017 |
| 2018/0322706 A1* | 11/2018 | Drouin | .............. | G06K 9/00201 |
| 2018/0342103 A1* | 11/2018 | Schwarz | ................. | G06F 3/017 |
| 2019/0026014 A1* | 1/2019 | Chapman | ............... | G02B 27/00 |

(Continued)

*Primary Examiner* — Tuyetlien T Tran
(74) *Attorney, Agent, or Firm* — Fenwick & West LLP

(57) ABSTRACT

A user views images through a head-mounted display (HMD). The HMD can display virtual interaction objects to a user on a reference plane, such as a keyboard and trackpad. The reference plane can be defined by the user by forming predetermined hand shapes with their hands. After the reference plane is generated, the HMD can display virtual interaction objects on the reference plane. To interact with the virtual objects, the HMD can track the hands of the user relative to the reference plane. For example, a finger tap on a virtual trackpad on the reference plane can indicate a click. Among other advantages, the reference plane is defined based on hand shapes of the user. Thus, the reference plane can be determined without the HMD identifying a surface in the real world (e.g., through object recognition).

20 Claims, 10 Drawing Sheets

(56) References Cited

U.S. PATENT DOCUMENTS

| | | | |
|---|---|---|---|
| 2019/0146578 A1* | 5/2019 | Ikuta | G06F 3/04815 |
| | | | 345/8 |
| 2019/0196591 A1* | 6/2019 | Long | G06F 3/017 |
| 2019/0362562 A1* | 11/2019 | Benson | G06K 9/00671 |
| 2020/0103658 A1* | 4/2020 | Ishikawa | G09G 5/006 |

* cited by examiner

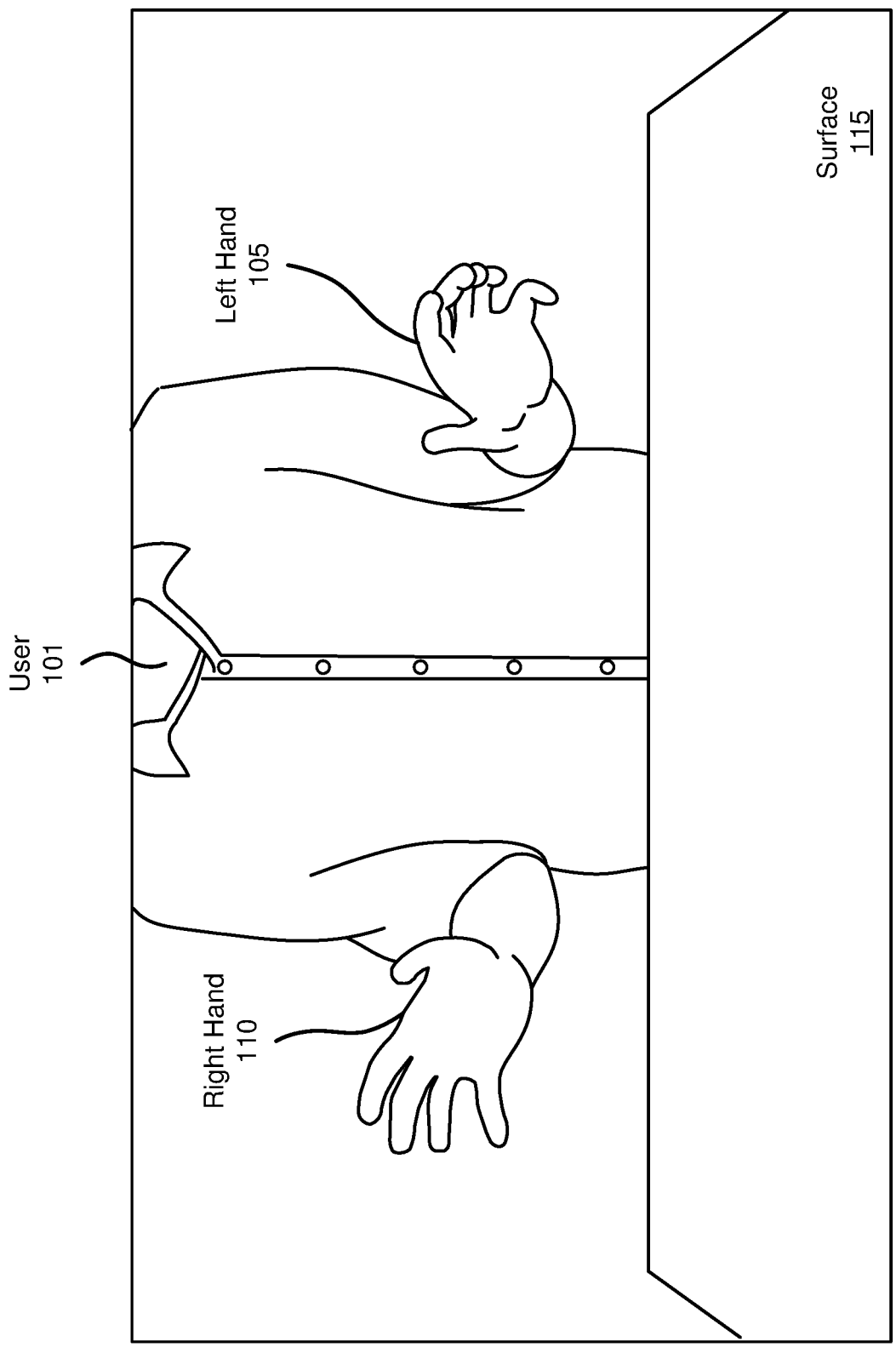

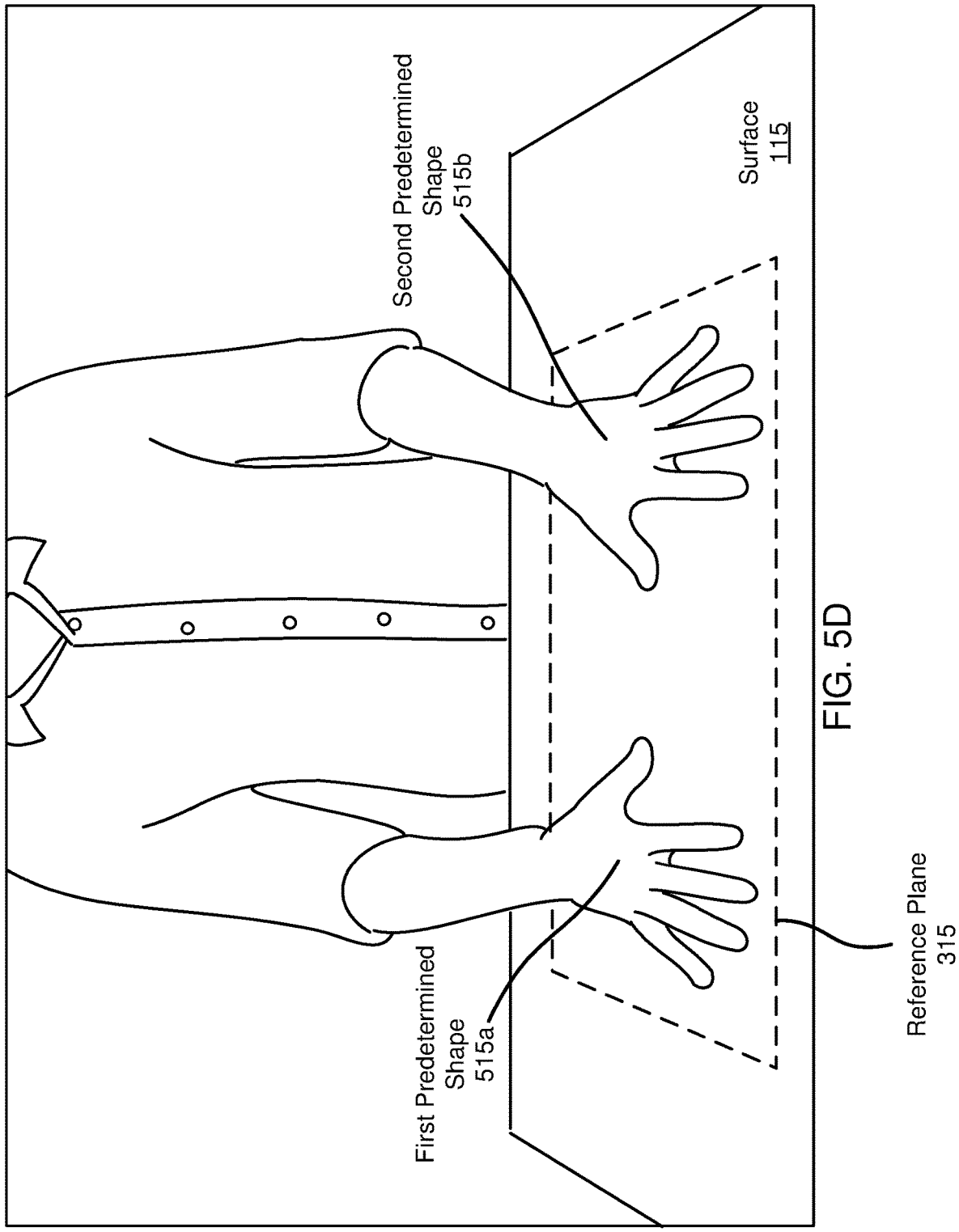

DISPLAYING VIRTUAL INTERACTION OBJECTS TO A USER ON A REFERENCE PLANE

BACKGROUND

The present disclosure relates to augmented and virtual reality systems and specifically, to interfaces using a reference plane to present virtual interaction objects to a user.

Head-mounted displays (HMDs) can be used to present information to a user through an immersive experience. This information may include traditional still images or videos, but often includes augmented reality (AR) or virtual reality (VR). HMDs are useful in a variety fields including gaming, engineering, medicine, and aviation.

When presenting AR or VR images to a user, HMDs typically perform object recognition in real time. For example, an HMD tracks the user's position relative to objects in a real-world environment. To present virtual objects that the user can interact with, an HMD may need to recognize and actively track the user and numerous objects throughout the real-world environment. This is resource intensive and can lead to system latencies or can limit the capabilities of the HMD.

SUMMARY

A virtual reality (VR) or augmented reality (AR) head-mounted display (HMD) displays images to a user. Among other objects, the HMD displays virtual interaction objects to the user, such as a virtual keyboard and virtual trackpad. By tracking the user's hand shapes, the HMD allows the user to interact with the virtual interaction objects. For example, a user can type messages by interacting with a virtual keyboard.

The virtual interaction objects are displayed to the user on a reference plane. The desired position, size, and orientation of the reference plane are established by the user placing their hands in predetermined shapes. For example, a predetermined shape is a hand on a surface. The HMD tracks the user's hands and generates the reference plane when the user's hands are in predetermined shapes. For example, the HMD generates a reference plane below the user's hands when a distance between the user's fingertips are a threshold distance apart (e.g., indicating the user's hands are flat). In another example, the location of the reference plane is established based on the location of three or more fingers (e.g., a reference plane is established if the thumb, index, middle, and ring fingers form a plane). The reference plane may be established during a calibration mode and the reference plane may be generated any number of times. For example, a user may desire to interact with virtual interaction objects on a new surface.

The reference plane may be established after a first hand is in a first predetermined shape. To ensure the reference plane is at a desired location and the user wants to interact with virtual interaction objects, the location of the reference plane may subsequently be confirmed after a second hand forms a second predetermined shape at the location of the reference plane. To assist the user to place the second predetermined shape at the location of the reference plane, the HMD may display one or more images that indicate the position and orientation of the reference plane. To determine whether the second predetermined shape is at the reference plane, the HMD may generate a second reference plane at the location of the second predetermined shape. The HMD subsequently determines whether the reference plane and the second reference plane are the same plane by determining whether the planes are parallel and within a threshold distance away from each other.

After the reference plane is defined, the HMD may display virtual interaction objects on the reference plane. To interact with the virtual interaction objects, the HMD tracks the shapes and locations of the user's hands relative to the reference plane. For example, a finger tap on a portion of the reference surface can correspond to a click function of a virtual trackpad. Among other advantages, the reference plane is defined based on hand shapes of the user. Furthermore, a user interacts with virtual interaction objects by performing hand gestures relative to the reference plane. Thus, the reference plane is determined and the user interacts with virtual objects without the HMD identifying objects or surfaces in the real world (e.g., through object recognition).

BRIEF DESCRIPTION OF DRAWINGS

FIGS. 5A-5D are a sequence of diagrams illustrating the establishment of a reference plane, according to some embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

As used herein, the location of an object can refer to the position in space and the orientation of the object. Example objects include a hand, a predetermined shape, and a reference plane. Furthermore, the location of a reference plane may also include the size of the reference plane. These terms and their context are further described below.

Figure 1:
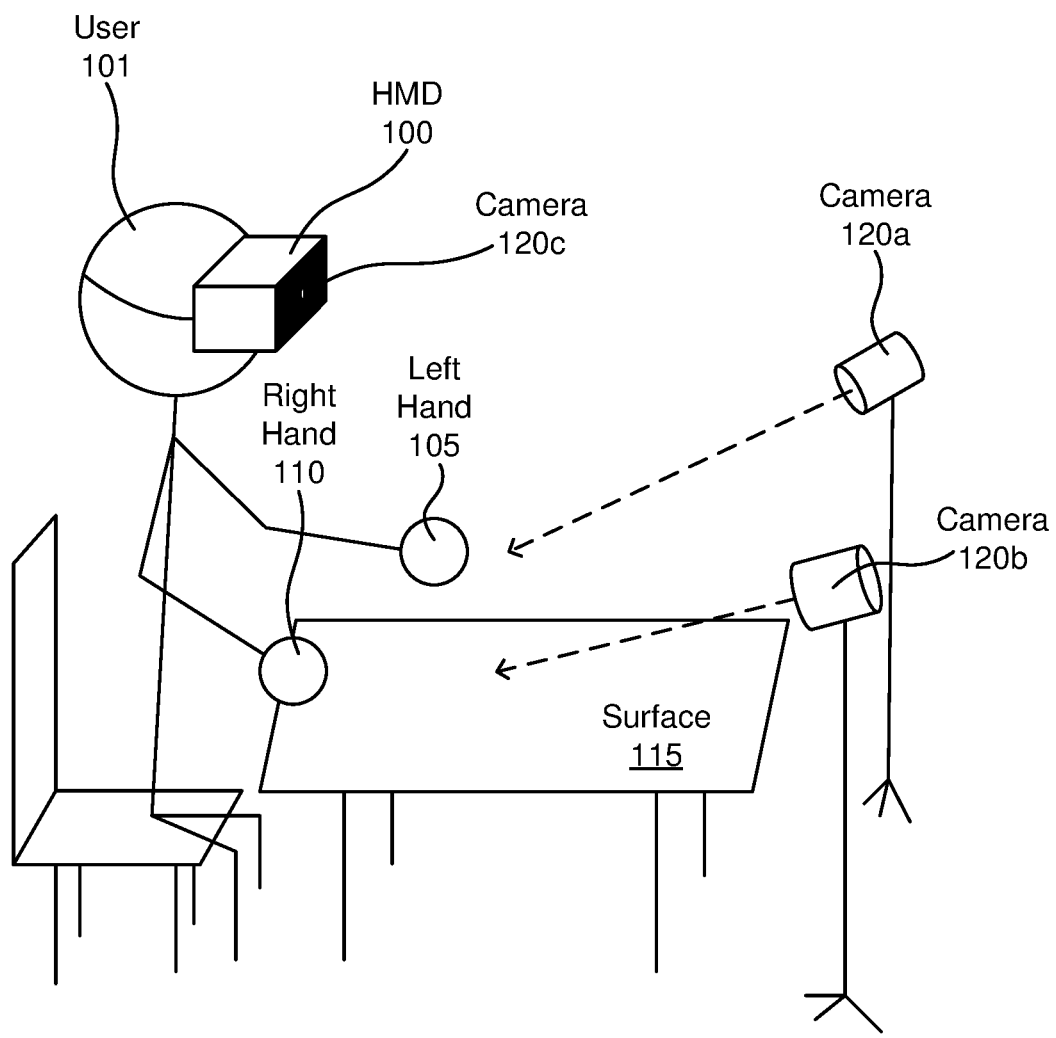
FIG. 1 illustrates an operating environment for a head-mounted display (HMD), according to an embodiment.

FIG. 1 illustrates an operating environment for a head-mounted display (HMD) 100, according to an embodiment. FIG. 1 includes a user 101 in front of a horizontal surface 115, such as a table top. The user 101 is wearing an HMD 100, and the HMD 100 is communicatively coupled to one or more cameras 120. The cameras 120 are directed towards the user's left hand 105 and right hand 110 and are used to track the position and shape of the user's hands. In this example, a first camera 120c is integrated into the HMD 100, and external cameras 120a, 120b are located across from the user 101 at an opposite side of the surface 115.

The HMD 100 presents augmented reality (AR) or virtual reality (VR) images to the user. The HMD 100 may present an entirely virtual environment or may present a portion of real-world images with overlaid content. By tracking the user's left hand 105 and right hand 110, the HMD 100 allows the user to define a reference plane and subsequently interact with the virtual interaction objects on the reference plane. In the display to the user, the HMD 100 can display virtual interaction objects to the user on the reference plane (not shown in FIG. 1) to provide a convenient means for the user to provide input and other interactions with the HMD 100. For example, the virtual interaction object may be a keyboard that allows the user to enter keyboard inputs to the HMD 100. By allowing the user to define the reference plane and generate the virtual interaction objects, a user can type messages by interacting with the virtual keyboard.

The cameras 120 are images sensors that capture images (or video frames) of the environment outside of the HMD 100. The HMD 100 may modify the captured images and present the modified images to the user 101 to create an AR or VR experience. Additionally, the cameras 120 are generally located to capture images of the user's hands 105, 110. Based on the image data from the cameras, the HMD 100 can track movement, gestures, locations, shapes, etc. of the user's hands 105, 110. While FIG. 1 includes an integrated camera 120c and two external cameras 120a, 120b, alternative camera configurations are possible. For example, one or more cameras integrated into the HMD 100 sufficiently capture images of the user's hands 105, 110.

Figure 2:
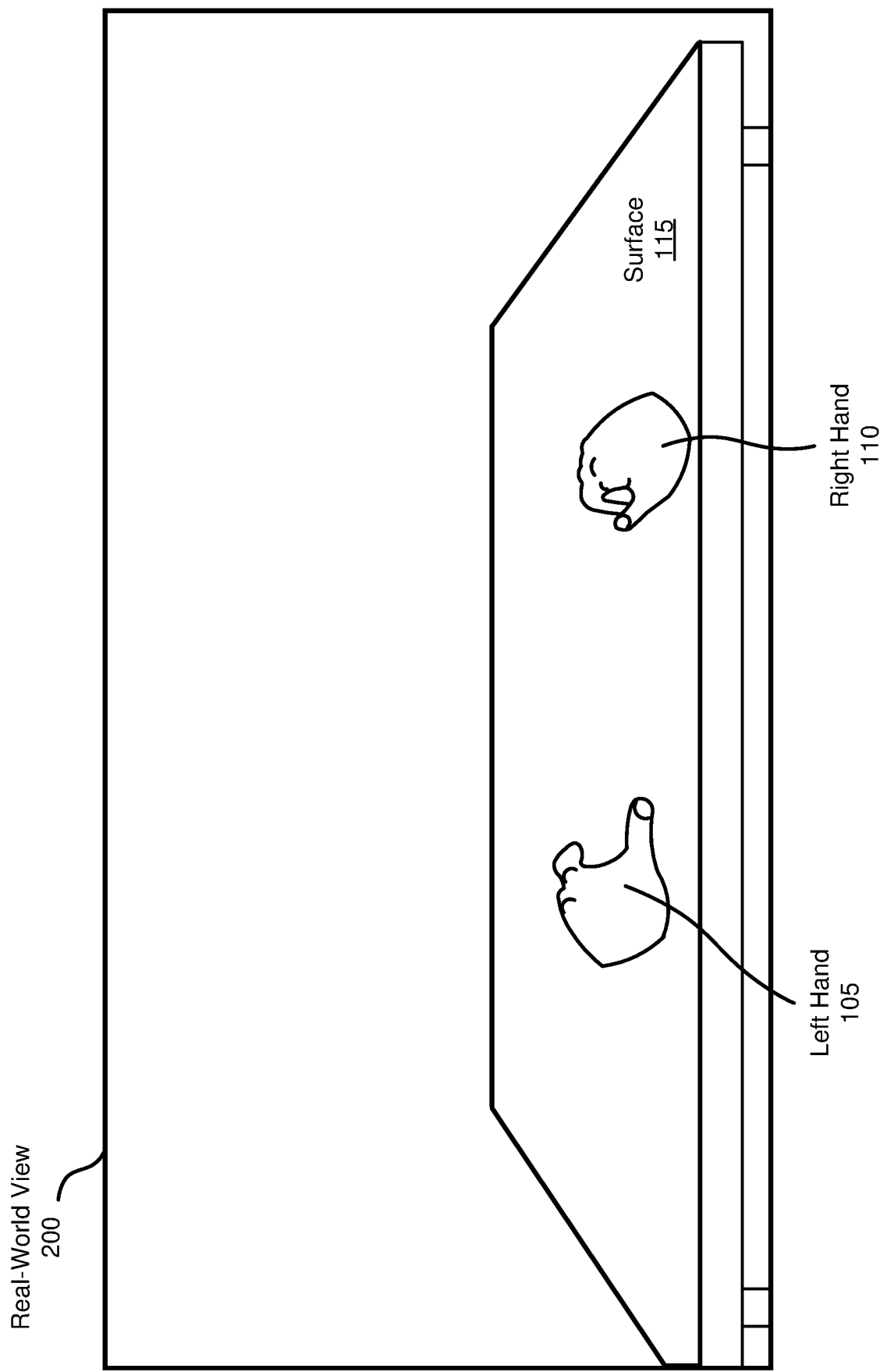
FIG. 2 illustrates a view of a real-world environment a user is in, according to an embodiment.

FIG. 2 illustrates a view 200 of a real-world environment the user 101 is in, according to an embodiment. The real-world view 200 may be a captured image of the real world from the perspective of a camera directly attached to the HMD 100 (e.g., camera 120c). The real-world view 200 includes a user's left hand 105 and right hand 110 on surface 115. For example, the user is sitting at a table with their hands resting on a surface of a table (e.g., as illustrated in FIG. 1). The user 101 can move their hands 105, 110 freely in the open space above the surface 115. Interactions with the HMD 100 or HMD applications may occur in the space. For example, the user can perform hand gestures within the space to control the HMD 100. These gestures (and associated control) may thus be performed without a controller or physical interface device, which may be cumbersome to use with the HMD 100. The user's arms and body and other objects in the real world (such as external cameras 120) are omitted for simplicity.

Figure 3:
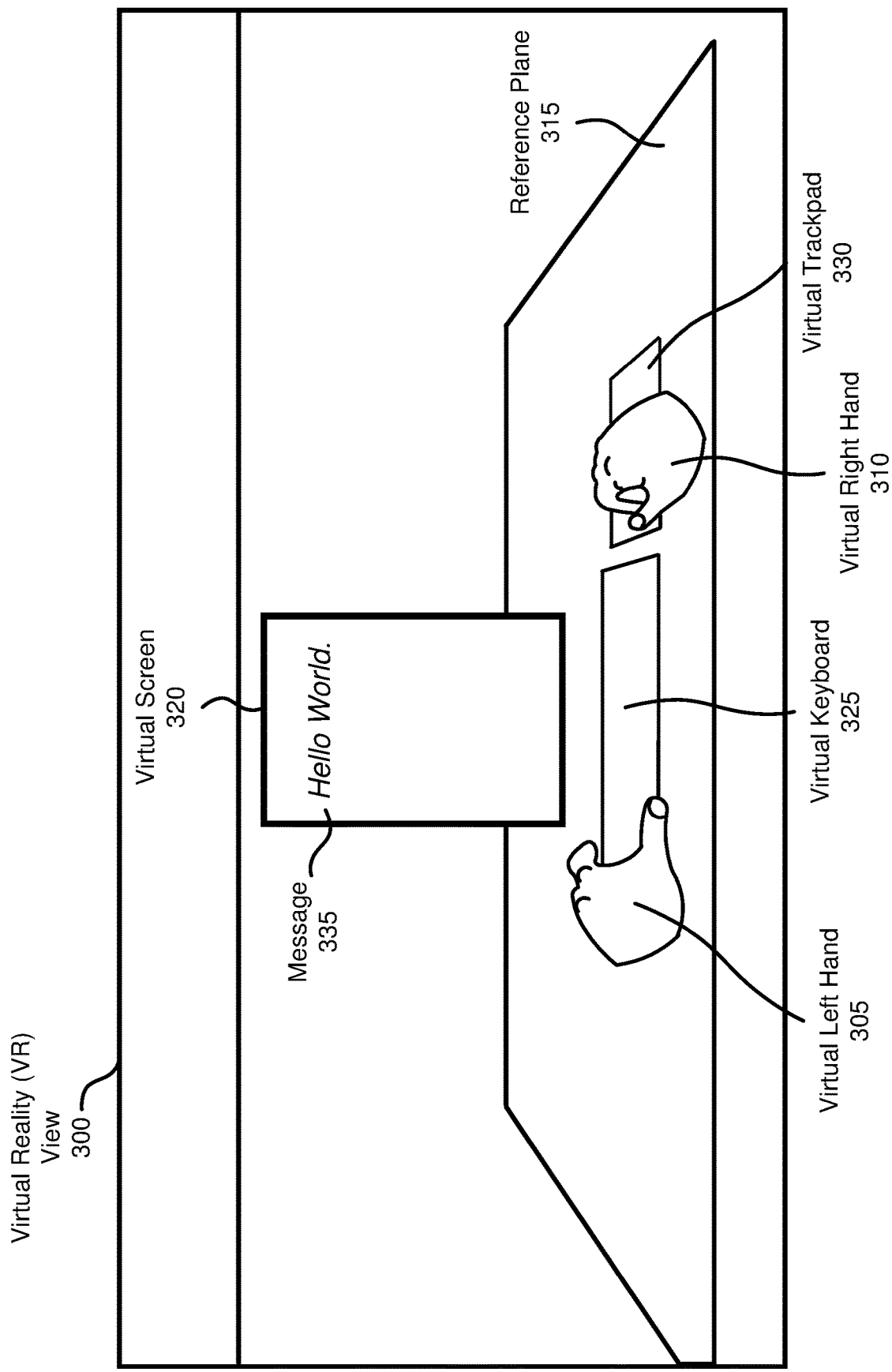
FIG. 3 illustrates a virtual reality view of the real-world view of FIG. 2, according to an embodiment.

FIG. 3 illustrates a virtual reality view 300, according to an embodiment. The virtual reality view 300 is a VR representation of the real-world view 200 that may be presented to the user 101 by the HMD 100. The virtual reality view 300 includes a virtual left hand 305 and a virtual right hand 310 resting on a reference plane 315. These are virtual objects that respectively correspond to the user's left hand 105 and right hand 110 resting on surface 115. The virtual reality view 300 also includes a virtual keyboard 325 and a virtual trackpad 330 on the reference plane 315 and a virtual screen 320 above the reference plane 315 and facing the user 101. In alternative embodiments, the virtual reality view 300 is an AR view that overlays virtual objects on image data from the camera. For example, the AR view includes real-world objects in the image data.

The reference plane 315 is a virtual plane that determines the position and orientation of interaction objects. The virtual plane 315 is generated by the HMD 100 and may be displayed to the user. As further described below, the position, orientation, and size of the reference plane 315 can be defined by the user 101 by placing their hands 105, 110 in predetermined shapes. This allows the user 101 to establish a reference plane 315 and interact with virtual interaction objects regardless of the physical environment he or she is in. In FIG. 3, the reference plane 315 is on the surface 115 of a real-world object (e.g., a table). The reference plane 315 can be generated on other physical surfaces, such as a desk, a canvas on an easel, a wall, etc. Additionally, the reference plane 315 may not be generated on a surface of a real-world object. For example, the reference plane 315 may be generated in mid-air with respect to surfaces and a user may not require interaction with a surface to form the predefined shape.

Using image data from the cameras 120, the HMD 100 can track the user's hands 105, 110 and display virtual representations of the hands 305, 310 in real time. Thus, the location of the virtual hands 305, 310 shown as a virtual representation can mimic the user's hands 105, 110 with respect to their location in the real-world. For example, the location and shape of the virtual hands 305, 310 match the user's hands 105, 110. Among other advantages, this can allow the user 101 to interact with virtual objects within the virtual reality view 300, by allowing the user 101 to view virtual representations of their hands 305, 310.

Virtual interaction objects are added to the user's display on the reference plane, typically at the location of one of the user's hands. The virtual interaction objects are objects displayed in the HMD that may be interacted with to provide input to the HMD and may simulate real-world, physical input devices. The virtual keyboard 325 and trackpad 330 are examples of virtual interaction objects. Interaction with these virtual interaction objects is typically provided by the user interacting with the real-world environment at the location corresponding to the location of the interaction objects. Virtual interaction objects are displayed at or on the reference plane 315, and the user 101 can interact with virtual interaction objects by performing hand gestures relative to the virtual interaction objects at the reference plane 315. For example, tapping the reference plane 315 (e.g., bringing finger within a threshold distance of the reference plane 315) at a location of a key of the keyboard 325 can corresponded to pressing the key.

User interactions with virtual interaction objects can cause one or more virtual interaction images to be displayed to the user 101. A virtual interaction image is a visual indicator that shows an interaction with a virtual interaction object occurred. Virtual interaction images can also include audio and haptic indicators. In the case of FIG. 3, interactions with the virtual keyboard 325 and virtual trackpad 330 can result in virtual interaction images being displayed on the virtual screen 320. For example, the user 101 can move a cursor across the virtual screen 320 by dragging a finger across a portion of the reference plane corresponding to the trackpad 330. In another example, the message 335 is displayed responsive to the user 101 interacting with the virtual keyboard 325.

Figure 4:
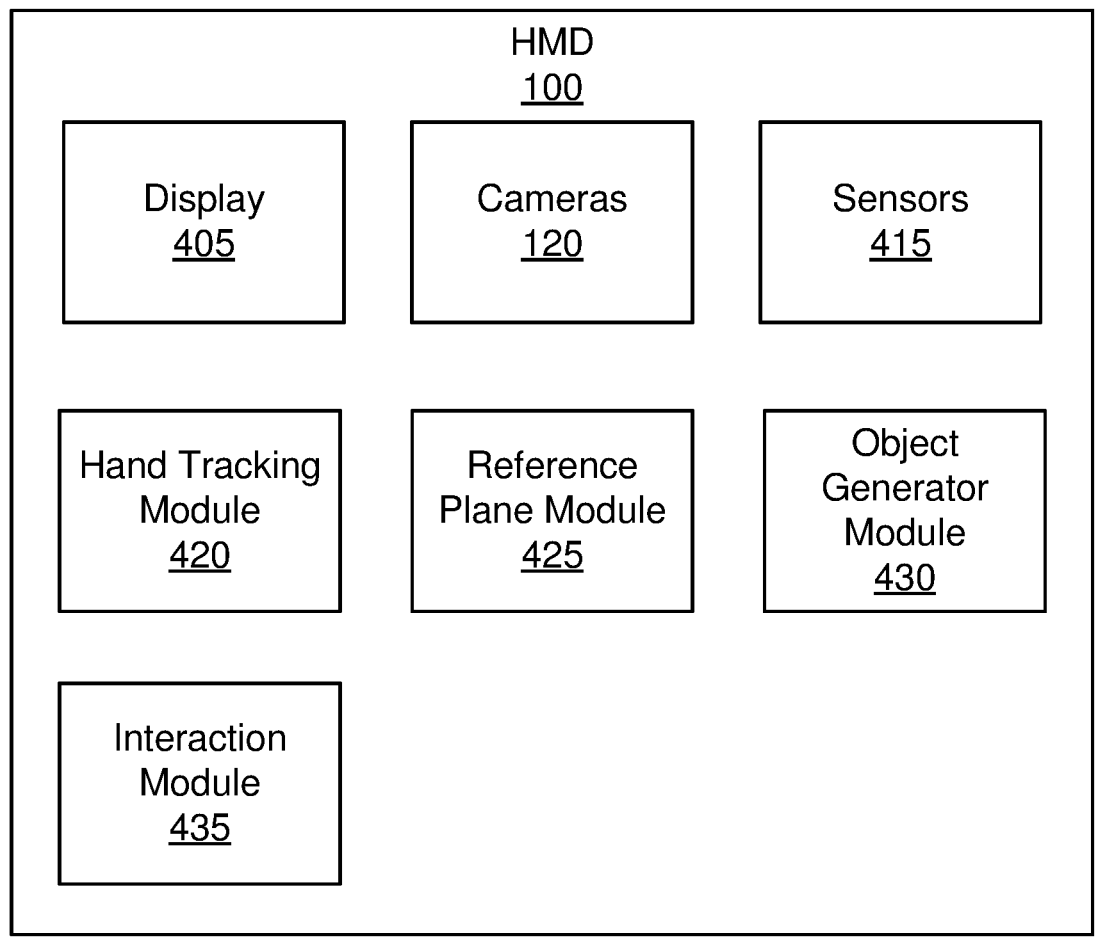
FIG. 4 illustrates a block diagram of an architecture of the HMD, according to an embodiment.

FIG. 4 illustrates a block diagram of an architecture of the HMD 100, according to an embodiment. The HMD 100 may include, among other components or modules, a display 405, cameras 120, sensors 415, a hand tracking module 420, a reference plane module 425, an object generator module 430, and an interaction module 435. In alternative embodiments, the HMD 100 may include additional, fewer, or different components and modules, and the operations associated with each module can be performed by different modules. Furthermore, the modules and components described below may be a part of the HMD 100 itself or outside of the HMD 100 (e.g., and communicatively coupled to the HMD 100).

The display 405 is a screen which displays images to the user 101. The images may comprise still images or video frames forming part of a movie, game, AR experience, VR experience, etc. The display 405 may comprise, for example, a liquid-crystal display (LCD), light-emitting diode (LED) display, plasma panel, electroluminescent pane, etc. Typically, during operation, the display 405 is placed proximate to the user's eyes such that the user's field of view is covered by the display 405.

The sensors 415 measure physical properties of the environment around the HMD 100. Various embodiments may measure different physical properties with different types of sensors. The physical properties may include, for example, motion of the HMD 100, orientation of the HMD 100, location of the HMD 100, or input provided to the HMD 100 from the user 101. The sensors 415 measuring such properties include an accelerometer, an inertial measurement unit, a GPS sensor, or indoor position sensor.

The hand tracking module 420 receives and analyzes image data from the cameras 120 to tracks hands 105, 110 of the user 101. The hand tracking module 420 recognizes the hand locations, shapes, and gestures of each hand 105, 110. In some embodiments, the hand tracking module 420 tracks the user's fingertips, for example when the predetermined shape is defined by the position of fingertips. The hand tracking module 420 recognizes when a hand 105, 110 forms a predetermined shape. Furthermore, after a reference plane 315 is generated, the hand tracking module 420 may track the user's hands 105, 110 relative to the reference plane 315.

Figure 5B:
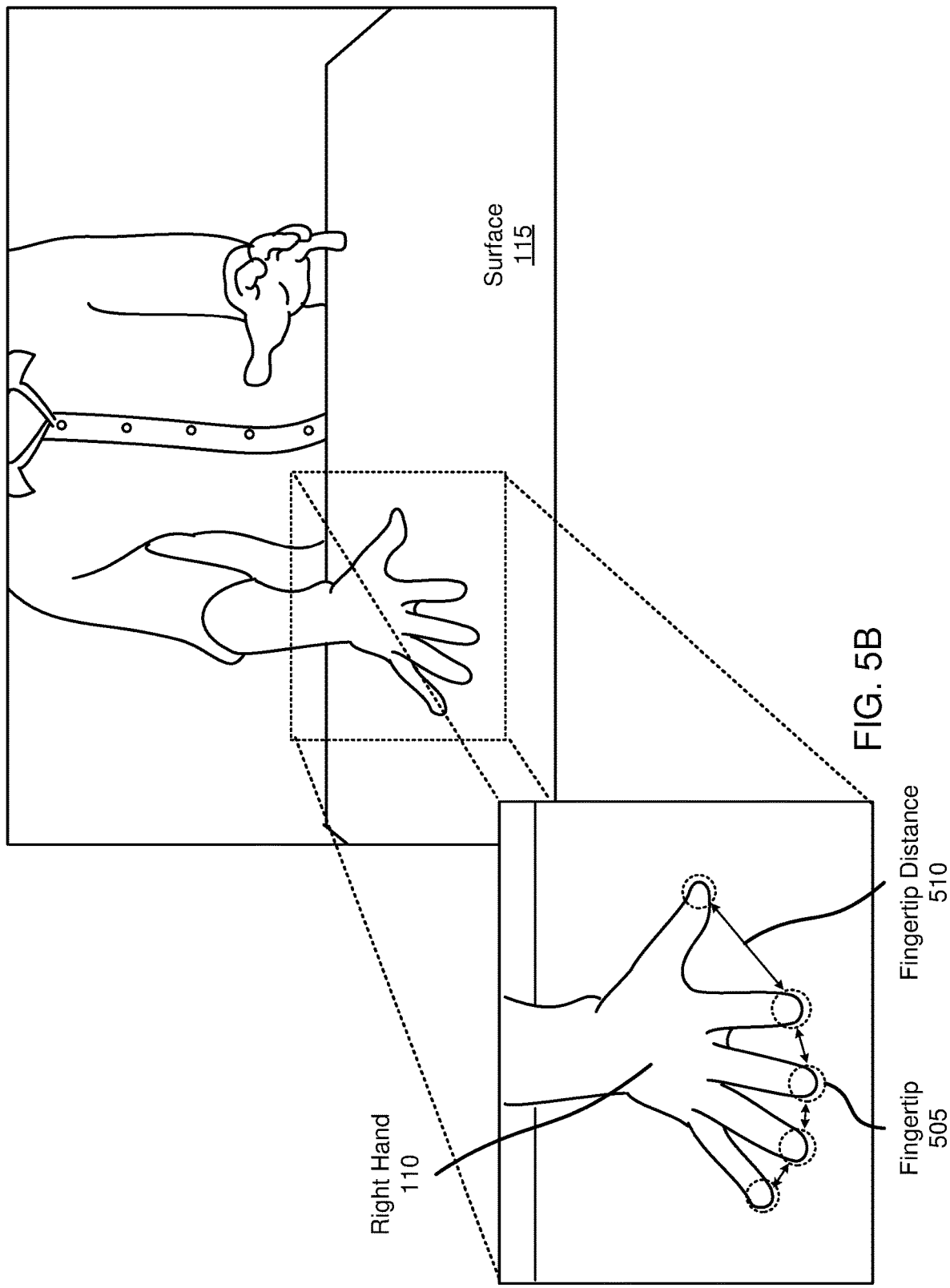
Figure 5C:
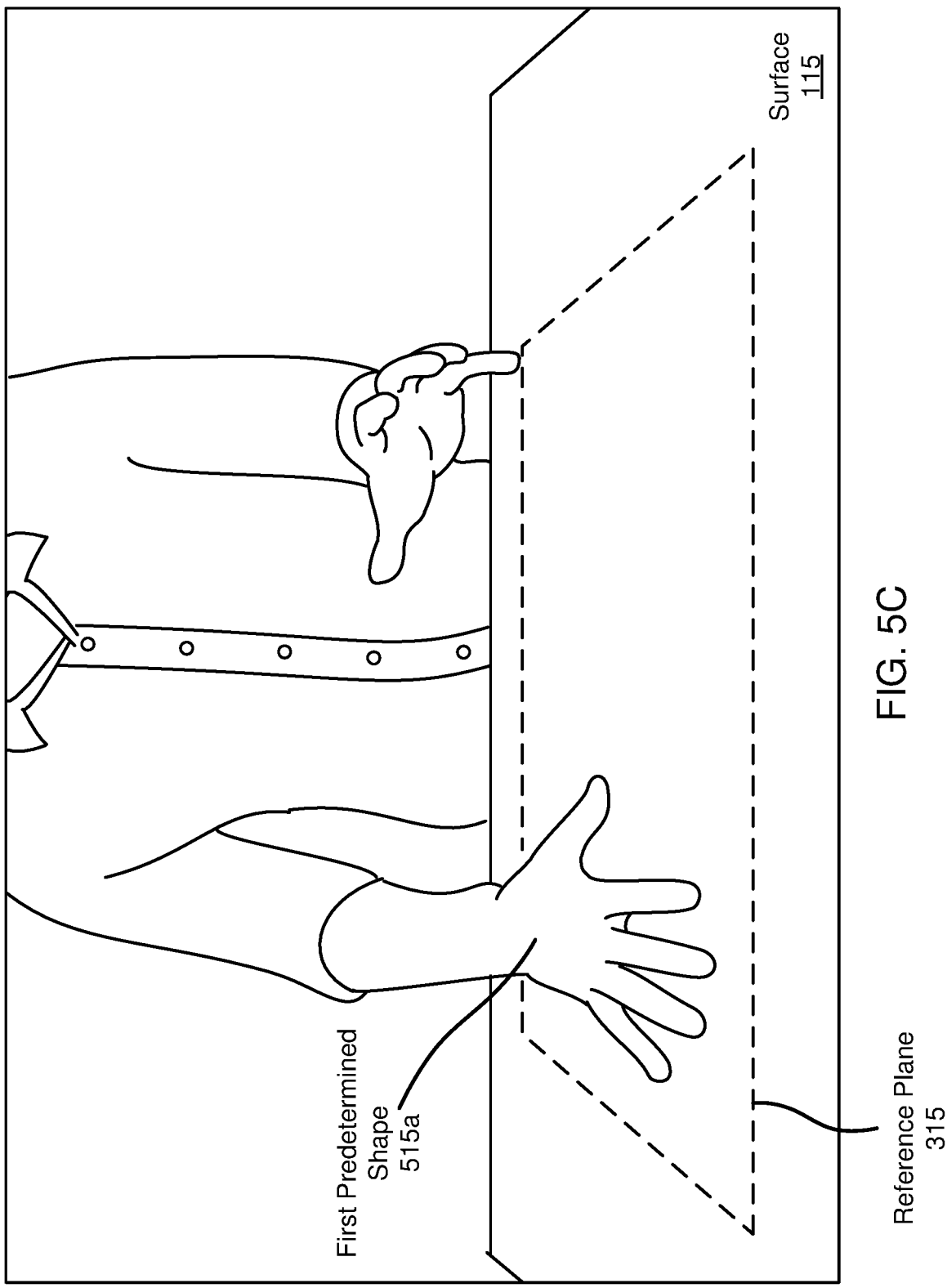

A predetermined shape is a hand shape that indicates a desired location for a reference plane 315 to be established. Specifically, the predetermined shape may indicate the desired position in space, desired orientation, and desired size for a reference plane 315. The predetermined shape may be defined by the HMD 100 or the user, for example during a calibration mode. Examples of predetermined shapes include a flat hand (e.g., as seen in FIGS. 5B and 5C), a fist, or three or more fingers forming a plane. The HMD 100 may recognize multiple predetermined shapes that indicate various desired locations. For example, the HMD 100 generates a reference plane of a first size responsive to recognizing a first predetermined shape or a reference plane of a second size responsive to recognizing a second predetermined shape. In some embodiments, a predetermined shape includes a hand gesture or hand location. Thus, a predetermined shape may not be recognized unless the shape is a predetermined location or the hand performs a predetermined gesture. For example, a predetermined shape includes one or more swiping motions to indicate a size and position of a desired reference plane 315. In another example, the HMD 100 only recognizes a predetermined shape if a hand is in front of the user 101 and below the user's head.

When the hand tracking module 420 recognizes a predetermined shape, it notifies the reference plane module 425, which generates a reference plane 315. Generally, the reference plane 315 is generated at the location of the predetermined shape. Specifically, the position in space, orientation, and size of the reference plane can be based on the position in space, orientation, and shape of the predetermined shape. For example, if a predetermined shape is a flat hand (e.g., on a surface in the real world), the reference plane module 425 can create a reference plane 315 below the user's hand and parallel to the user's palm.

In some embodiments, the reference plane module 425 can generate additional reference planes. For example, the reference plane module 425 generates a reference plane for each hand 105, 110 that forms a predetermined shape. If the position and orientation of two planes becomes similar, the reference plane module 425 may join the planes for form a single reference plane for presenting virtual interaction objects.

The object generator module 430 provides virtual interaction objects are presented to the user 101 by the display 405. The virtual interaction objects are displayed at or on the reference plane. For example, virtual touch screen is provided on a portion of the reference plane. Virtual interaction objects may also be displayed above or below the reference plane.

The interaction module 435 detects interactions with the virtual interaction objects and provides interaction images to the image data that is presented to the user 101. The interaction module 435 may communicate with the hand tracking module 420 to detect interactions with virtual interaction objects by recognizing hand gestures relative to the reference plane.

FIGS. 5A-5D are a sequence of diagrams illustrating the establishment of a reference plane, according to some embodiments. In some embodiments, FIGS. 5A-5D illustrate steps that occur during a calibration mode of the HMD 100. The diagrams illustrated in the figures may be views captured from a camera 120, such as camera 120a.

FIG. 5A illustrates a user 101 in front of a surface 115 to establish a reference plane 315, according to an embodiment. The user's hands 105, 110 are above the surface 115. Based on image data captured by a camera 120, the HMD 100 tracks the location and shape each hand 105, 110.

FIGS. 5B and 5C illustrate the user 101 in front of the surface 115 with the left hand 105 over the surface 115 and the right hand 110 on the surface 115, according to an embodiment. The right hand 110 is flat on the surface 115, and thus the user's palms are parallel to the surface 115. In the examples of FIGS. 5B and 5C the right hand 110 is in a first predetermined shape 515a. In FIG. 5B, the fingertips 505 and distances between adjacent fingers (referred to as fingertip distances 510) of the right hand 110 are indicated. In some embodiments, the HMD 100 tracks the fingertips 505 and fingertip distances 510 of each hand in real time. In FIG. 5C, a reference plane 315 is defined parallel to the palm of the right hand 110 and a perimeter of the reference plane 315 encloses the right hand 110 (as seen from a view perpendicular to the surface 115).

In some embodiments, HMD 100 tracks the fingertip distances 510 between two or more fingers to determine if one or more hands 105, 110 are in a predetermined shape. For example, the HMD 100 determines a hand 105 or 110 is in a predetermined shape if a fingertip distance 510 between two fingertips 505 substantially equals a value (e.g., within a few millimeters). Referring to FIG. 5B, the HMD 100 may determine that the right hand 110 is in a predetermined shape (e.g., flat) by determining that each of the fingertip distances 510 are above one or more threshold values.

After recognizing the right hand 110 is in the first predetermined shape 515a, the HMD 100 generates the reference plane 315. As indicated in FIG. 5C, the reference plane 315 is located at the location of the first predetermined shape 515a. Specifically, the position in space and orientation (and possibly the size) of the reference plane 315 can be defined by the position in space and orientation of the first predetermined shape 515a formed by the right hand 110. In some embodiments, the location of the reference plane 315 moves with the location of the first predetermined shape 515a in real time.

FIG. 5D illustrates the user 101 in front of the surface 115 with both hands 105, 110 on the surface 115, according to an embodiment. The user's hands 105, 110 are flat on the surface 115 and thus the user's palms are parallel to the surface 115. The reference plane 315 is parallel to the palms of the user's hands 105, 110 and a perimeter of the reference plane 315 encloses both hands 105, 110 (as seen from a view perpendicular to the surface 115). The reference plane 315 was previously defined based on the first predetermined shape 515a. To confirm the location of the reference plane 315 and to confirm the user 101 desires to interact with virtual interaction objects, the user 101 forms a second predetermined shape 515b with the left hand 105. If the second predetermined shape 515b is located at the reference plane 315, then the location of reference plane 315 is confirmed. In some embodiments, to ensure the user 101 understands where the reference plane 315 is located, virtual interaction objects are not displayed on the reference plane 315 until the reference plane 315 is confirmed. If the location of the second predetermined shape 515b does not match the location of the reference plane 315, the HMD 100 may provide an indicator to the user 101 to adjust the location of one or both hands 105, 110 in the predetermined shapes 515a, 515b.

Prior to the user 101 forming a second predetermined shape 515b, the location of the reference plane 315 may be provided to the user 101 by a visual indicator. For example, the reference plane 315 is illuminated such that the position and orientation of the reference plane 315 are displayed to the user 101. Among other advantages, this can assist the user 101 to form a second predetermined shape 515b at the location of the reference plane 315.

In some embodiments, the HMD 100 determines the second predetermined shape 515b is located at the reference plane 315 by generating a second reference plane (not shown) based on the second predetermined shape 515b and determining whether the reference plane 315 and the second reference plane are substantially the same plane. Specifically, the HMD 100 generates a second reference plane at a location of the second predetermined shape 515b. After the second reference plane is established, the HMD 100 determines if the second reference plane and the reference plane 315 are substantially parallel (e.g., the orientation is within a few degrees). The HMD 100 also measures the distance between the reference plane 315 and the second plane. If the distance is below a threshold (e.g., a few millimeters), the HMD 100 determines that the planes are substantially the same. Thus, if the planes are substantially the same, the second predetermined shape can be used to confirm the location reference plane 315.

In some embodiments, if any hand 105, 110 is in a predetermined shape, a reference plane is generated at the location of the predetermined shape. If reference planes are generated for the left hand 105 and the right hand 110 and the HMD 100 determines that the reference planes are substantially the same plane, then a single reference plane can be established for providing virtual interaction objects.

In some embodiments, multiple reference planes can be established to enable virtual interaction objects to be display at or on one or more of the reference planes. For example, referring to FIG. 3, in addition to the reference plane 315, an additional reference plane can be generated at the virtual screen 320. Thus, the virtual screen 320 can be a virtual interaction object (e.g., a touch screen) in addition to the virtual keyboard 325 and the virtual trackpad 330. In some embodiments, the user 101 changes the location of the reference plane 315 by forming a predetermined shape.

Figure 6B:
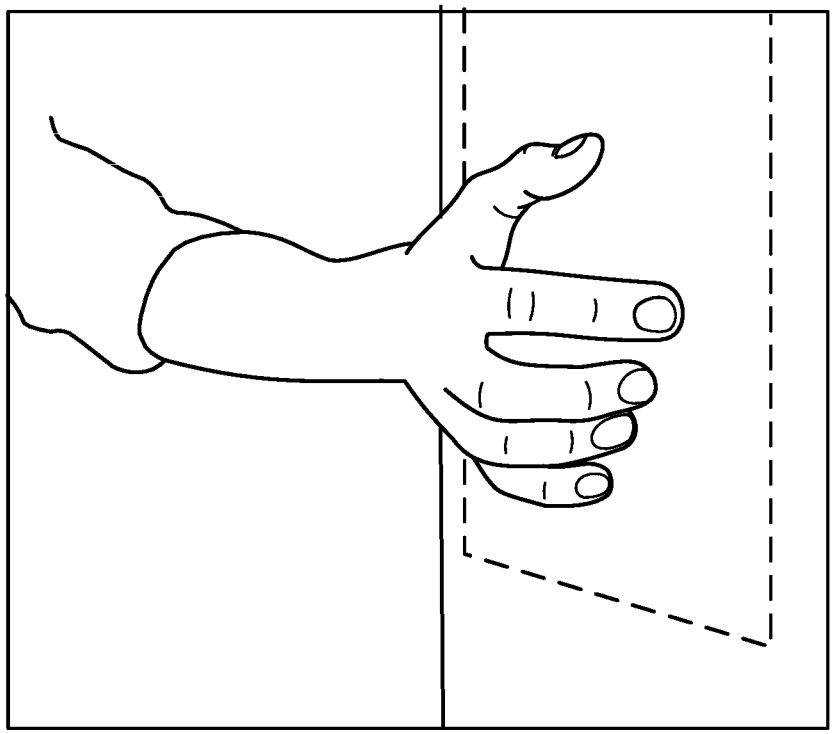
FIGS. 6A and 6B illustrate the right hand of the user performing a finger gesture relative to the reference plane, according to an embodiment.
Figure 6A:
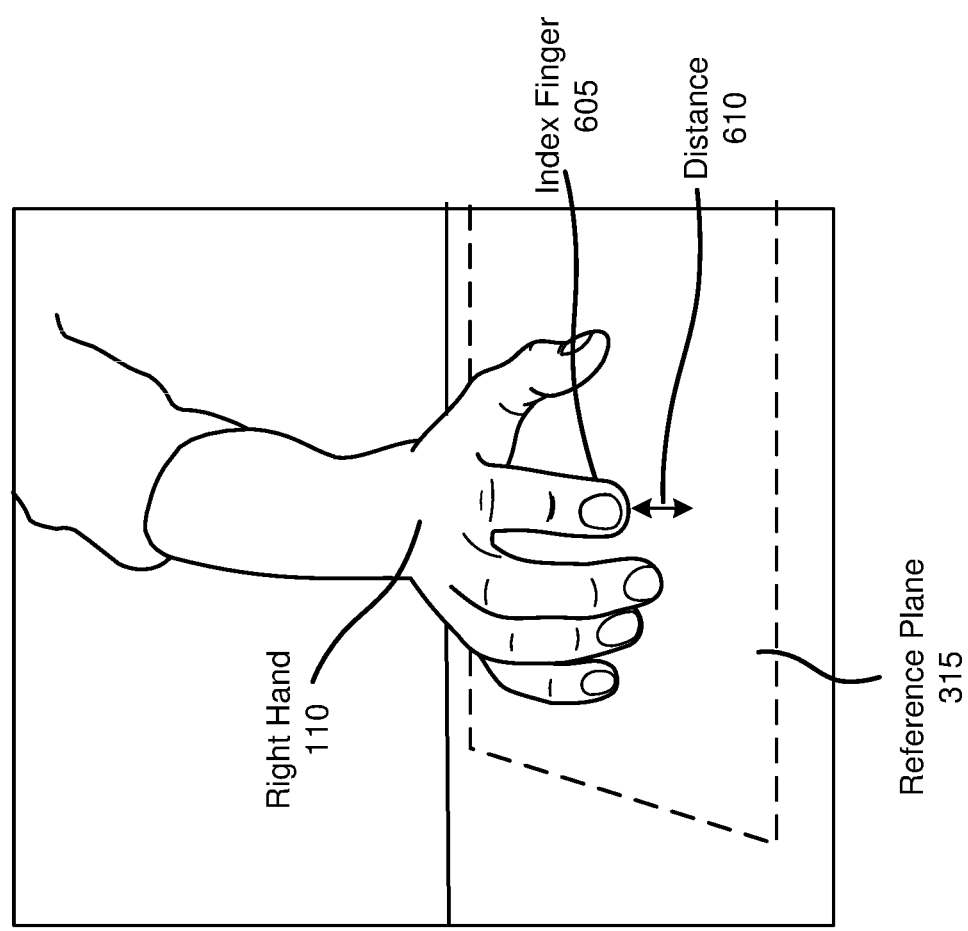

FIGS. 6A and 6B illustrate the right hand 110 of the user 101 performing a finger gesture relative to the reference plane 315 (e.g., after the reference plane has been established and confirmed), according to an embodiment. FIGS. 6A and 6B demonstrate an example interaction with a virtual interaction object (virtual interaction object not shown). The views illustrated in FIGS. 6A and 6B may be views captured from a camera 120, such as camera 120a. In FIG. 6A, the index finger 605 is above the reference plane 315 by a distance 610, and in FIG. 6B, the index finger is on the reference plane 315. Thus, for example, the user 101 may be performing a click function with a virtual trackpad 330 by bringing their index finger within a threshold distance of the reference plane 315.

Figure 7:
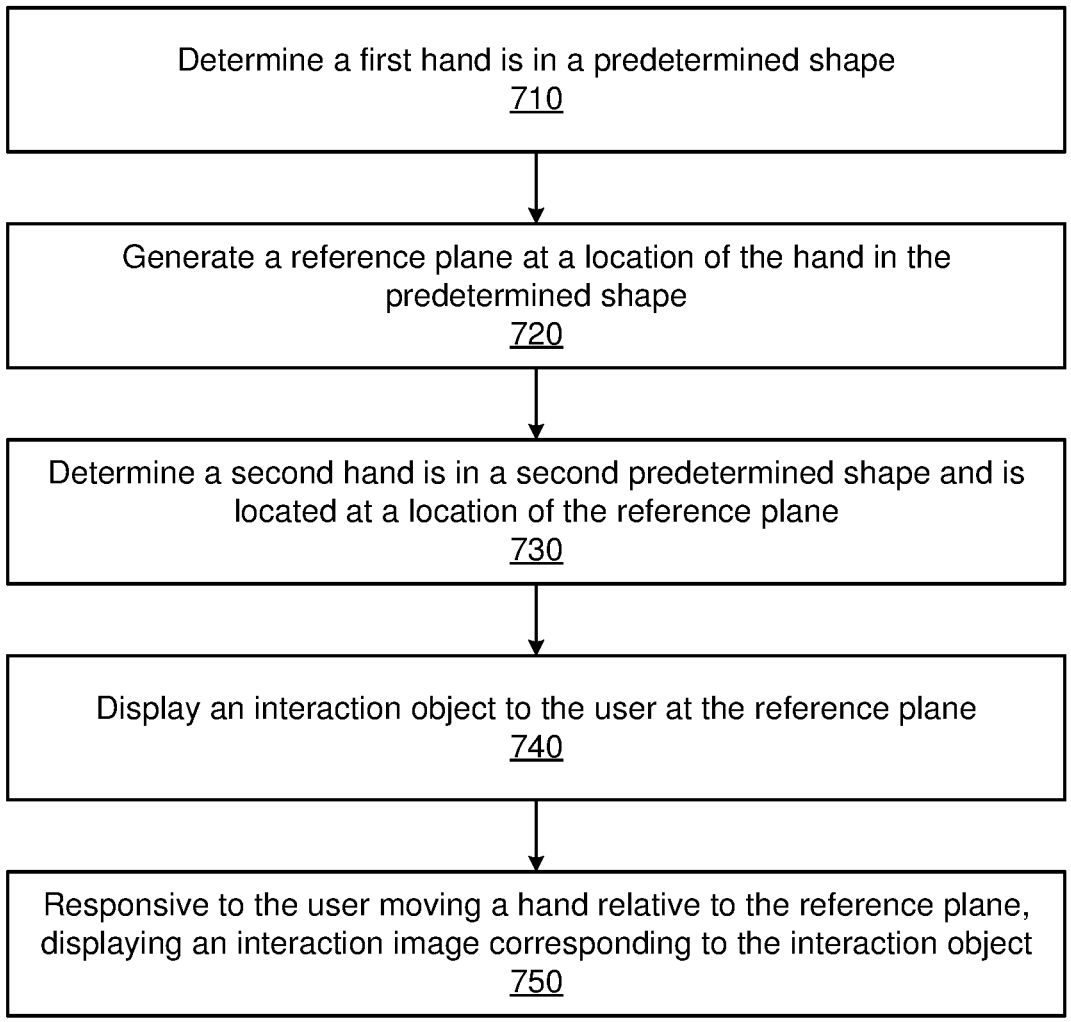
FIG. 7 is a flow chart illustrating a method for generating a reference plane and presenting a virtual interaction object to a user wearing an HMD, according to one embodiment.

FIG. 7 is a flow chart illustrating a method for generating a reference plane and presenting a virtual interaction object to a user wearing an HMD, according to one embodiment. The steps of method may be performed in different orders, and the method may include different, additional, or fewer steps.

A head-mounted display (HMD) determines 710 a first hand is in a predetermined shape. Prior to this, in some embodiments, the locations of the fingertips of the first hand are tracked. To determine the hand is in the predetermined shape, one or more distances between the fingertips of the first hand may be measured. If the HMD determines that the one or more distances are greater than one or more thresholds, then the HMD can determine that the first hand is in a predetermined shape. In some embodiments, the predetermined shape is the first hand on a surface.

The HMD generates 720 a reference plane at a location of the hand in the predetermined shape. In some embodiments, the location of the reference plane is defined by the location of three or more fingers of the first hand. In some embodiments, after generating the reference plane, a visual indicator is displayed to the user. The visual indicator indicates the location of the reference plane, where the location of the reference plane includes a position and an orientation of the reference plane relative to the first hand.

The HMD determines 730 a second hand is in a second predetermined shape and the second hand is located at a location of the reference plane. The HMD can determine the second hand is in a second predetermined shape and the second hand is located at the reference plane by measuring one or more distances between fingertips of the second hand. The HMD determines the one or more distances are greater than one or more thresholds. A second reference plane is generated at the location of the second hand in the second predetermined shape. The HMD determines the second reference plane is substantially parallel to the reference plane. A distance between the reference plane and the second reference plane is measured. The distance between the reference plane and the second reference plane is determined to be below a threshold.

The HMD displays 740 a virtual interaction object to the user at the reference plane. The virtual interaction object can include a trackpad or a keyboard.

Responsive to the user moving at least one hand relative to the reference plane, the HMD displays 750 an interaction image corresponding to the virtual interaction object to the user. In some embodiments, moving the at least one hand relative to the reference plane includes placing a finger of the at least one hand of the user within a threshold distance of the reference plane.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining a first hand of a user is in a predetermined shape;
   generating a reference plane at a location of the first hand in the predetermined shape;
   determining a second hand is in a second predetermined shape and the second hand is located at a location of the reference plane, wherein the second hand is different than the first hand, and wherein determining the second hand is in a second predetermined shape and the second hand is located at the location of reference plane comprises:
   measuring one or more distances between fingertips of the second hand;
   determining the one or more distances are greater than one or more thresholds;
   generating a second reference plane at the location of the second hand in the second predetermined shape;
   determining an orientation of the second reference plane relative to the reference plane;
   measuring a distance between the reference plane and the second reference plane; and
   determining the distance between the reference plane and the second reference plane is below a threshold;
   responsive to determining the second hand is in the second predetermined shape and is located at the location of the reference plane, confirming the reference plane as a plane to display a virtual interaction object;
   responsive to confirming the reference plane as a plane to display a virtual interaction object, displaying a virtual interaction object to the user at the reference plane; and
   responsive to the user moving at least one hand relative to the reference plane, displaying an interaction image corresponding to the virtual interaction object to the user.

2. The method of claim 1, further comprising tracking locations of fingertips of the first hand.

3. The method of claim 2, wherein determining the first hand of the user is in a predetermined shape comprises:
   measuring one or more distances between the fingertips of the first hand; and
   determining the one or more distances are greater than one or more thresholds.

4. The method of claim 1, wherein the predetermined shape is the first hand on a surface.

5. The method of claim 1, wherein the virtual interaction object includes at least one of a trackpad and a keyboard.

6. The method of claim 1, further comprising:
   subsequent to generating the reference plane, displaying a visual indicator to the user, the visual indicator indicating the location of the reference plane, the location of the reference plane including a position and an orientation of the reference plane relative to the first hand.

7. The method of claim 1, wherein moving the at least one hand relative to the reference plane comprises:
   placing a finger of the at least one hand of the user within a threshold distance of the reference plane.

8. The method of claim 1, wherein the location of the reference plane is defined by the location of three or more fingers of the first hand.

9. A non-transitory computer-readable storage medium storing executable computer program code that, when executed by one or more processors, cause the one or more processors to perform operations comprising:
  determining a first hand of a user is in a predetermined shape;
  generating a reference plane at a location of the first hand in the predetermined shape;
  determining a second hand is in a second predetermined shape and the second hand is located at a location of the reference plane, wherein the second hand is different than the first hand, and wherein determining the second hand is in a second predetermined shape and the second hand is located at the location of reference plane comprises:
    measuring one or more distances between fingertips of the second hand;
    determining the one or more distances are greater than one or more thresholds;
    generating a second reference plane at the location of the second hand in the second predetermined shape;
    determining an orientation of the second reference plane relative to the reference plane;
    measuring a distance between the reference plane and the second reference plane; and
    determining the distance between the reference plane and the second reference plane is below a threshold;
  responsive to determining the second hand is in the second predetermined shape and is located at the location of the reference plane, confirming the reference plane as a plane to display a virtual interaction object;
  responsive to confirming the reference plane as a plane to display a virtual interaction object, displaying a virtual interaction object to the user at the reference plane; and
  responsive to the user moving at least one hand relative to the reference plane, displaying an interaction image corresponding to the virtual interaction object to the user.

10. The storage medium of claim 9, further comprising tracking locations of fingertips of the first hand.

11. The storage medium of claim 10, wherein determining the first hand of the user is in a predetermined shape comprises:
  measuring one or more distances between the fingertips of the first hand; and
  determining the one or more distances are greater than one or more thresholds.

12. The storage medium of claim 9, wherein the predetermined shape is the first hand on a surface.

13. The storage medium of claim 9, wherein the virtual interaction object includes at least one of a trackpad and a keyboard.

14. The storage medium of claim 9, further comprising:
  subsequent to generating the reference plane, displaying a visual indicator to the user, the visual indicator indicating the location of the reference plane, the location of the reference plane including a position and an orientation of the reference plane relative to the first hand.

15. The storage medium of claim 9, wherein moving the at least one hand relative to the reference plane comprises:
  placing a finger of the at least one hand of the user within a threshold distance of the reference plane.

16. The storage medium of claim 9, wherein the location of the reference plane is defined by the location of three or more fingers of the first hand.

17. A computer system comprising:
  one or more processors; and
  a computer-readable storage medium comprising executable computer program code, the computer program code when executed causing the one or more processors to perform operations including:
    determining a first hand of a user is in a predetermined shape;
    generating a reference plane at a location of the first hand in the predetermined shape;
    determining a second hand is in a second predetermined shape and the second hand is located at a location of the reference plane, wherein the second hand is different than the first hand, and wherein determining the second hand is in a second predetermined shape and the second hand is located at the location of reference plane comprises:
      measuring one or more distances between fingertips of the second hand;
      determining the one or more distances are greater than one or more thresholds;
      generating a second reference plane at the location of the second hand in the second predetermined shape;
      determining an orientation of the second reference plane relative to the reference plane;
      measuring a distance between the reference plane and the second reference plane; and
      determining the distance between the reference plane and the second reference plane is below a threshold;
    responsive to determining the second hand is in the second predetermined shape and is located at the location of the reference plane, confirming the reference plane as a plane to display a virtual interaction object;
    responsive to confirming the reference plane as a plane to display a virtual interaction object, displaying a virtual interaction object to the user at the reference plane; and
    responsive to the user moving at least one hand relative to the reference plane, displaying an interaction image corresponding to the virtual interaction object to the user.

18. The computer system of claim 17, further comprising tracking locations of fingertips of the first hand and wherein determining the first hand of the user is in a predetermined shape comprises:
  measuring one or more distances between the fingertips of the first hand; and
  determining the one or more distances are greater than one or more thresholds.

19. The computer system of claim 17, wherein the predetermined shape is the first hand on a surface.

20. The computer system of claim 17, wherein the virtual interaction object includes at least one of a trackpad and a keyboard.

* * * * *